(12) United States Patent
Hawkins

(10) Patent No.: US 7,350,751 B2
(45) Date of Patent: Apr. 1, 2008

(54) ANTI-FLIP LANDING GEAR FOR AIRCRAFT

(75) Inventor: Thomas Hawkins, Mountain View, CA (US)

(73) Assignee: Icon Aviation, Inc., Los Angeles, CA (US)

( * ) Notice: Subject to any disclaimer, the term of this patent is extended or adjusted under 35 U.S.C. 154(b) by 0 days.

(21) Appl. No.: 11/399,977

(22) Filed: Apr. 7, 2006

(65) Prior Publication Data

US 2006/0226286 A1     Oct. 12, 2006

Related U.S. Application Data

(60) Provisional application No. 60/669,762, filed on Apr. 8, 2005.

(51) Int. Cl.
*B64C 25/54* (2006.01)

(52) U.S. Cl. ............................... 244/101; 244/105

(58) Field of Classification Search ............ 244/100 R, 244/101, 102 R, 104 R, 105, 106, 108; 340/960, 340/962, 963
See application file for complete search history.

(56) References Cited

U.S. PATENT DOCUMENTS

| 1,922,371 | A | * | 8/1933 | Jones | 244/102 R |
|---|---|---|---|---|---|
| 2,580,452 | A | * | 1/1952 | Miller | 244/102 R |
| 3,748,635 | A | * | 7/1973 | Phillips et al. | 367/93 |
| 4,278,219 | A | * | 7/1981 | Finance | 244/100 R |
| 4,516,124 | A | * | 5/1985 | Shannon et al. | 340/960 |
| 4,692,752 | A | * | 9/1987 | Abel | 340/604 |
| 6,059,228 | A | * | 5/2000 | Koizumi et al. | 244/102 R |
| 6,157,891 | A | * | 12/2000 | Lin | 701/301 |
| 6,264,139 | B1 | * | 7/2001 | Dazet | 244/102 R |
| 6,848,650 | B2 | * | 2/2005 | Hoisignton et al. | 244/13 |
| 6,927,702 | B2 | * | 8/2005 | Wiplinger | 340/960 |

* cited by examiner

*Primary Examiner*—Michael J. Carone
*Assistant Examiner*—Benjamin P Lee
(74) *Attorney, Agent, or Firm*—Mark Terry

(57) ABSTRACT

A system for controlling landing gear of an aircraft is disclosed. The apparatus includes a sensor for sensing water, wherein the sensor is coupled to the landing gear and a retracting device for retracting the landing gear when the sensor senses a body of water. In one alternative, the aircraft is an amphibious aircraft and the sensor senses electrical conductivity. In another alternative, the retracting device comprises a hydraulic system for deploying and retracting the landing gear, wherein the hydraulic system retracts the landing gear when the sensor senses a body of water. In yet another alternative, the retracting device comprises a locking mechanism that locks the landing gear to the aircraft, wherein the locking mechanism unlocks the landing gear so as to detach it from the aircraft when the sensor senses a body of water.

16 Claims, 6 Drawing Sheets

ANTI-FLIP LANDING GEAR FOR AIRCRAFT

CROSS-REFERENCE TO RELATED APPLICATIONS

The present patent application claims priority to U.S. provisional patent application Ser. No. 60/669,762 filed on Apr. 8, 2005 and entitled "Anti-Flip Landing Gear for Amphibious Airplanes." U.S. provisional patent application Ser. No. 60/669,762 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of light-sport aircraft design and more particularly relates to the field of landing gear for amphibious aircraft.

BACKGROUND OF THE INVENTION

The Federal Aviation Administration (FAA) recently instituted a new aircraft certification for Light-Sport Aircraft. Section 1.1 of title 14 of the Code of Federal Regulations (CFR) puts forth the details of the new certification. Light-sport aircraft are simple, low-performance aircraft that are limited to 1,320 lbs. maximum weight, two occupants, a single non-turbine powered engine, stall speed of 45 knots, maximum airspeed of 120 knots, and fixed landing gear. Aircraft categories include airplanes, weight-shift-control aircraft, powered parachutes, gyroplanes, gliders, balloons and airships.

The FAA further instituted a new airworthiness certificate entitled Special Light-Sport Airworthiness Certificate. The details of this certificate are defined in section 21.190 of title 14 of the Code of Federal Regulations. This new category of special airworthiness certificate is issued to aircraft that are designed and manufactured to an identified standard developed by industry and accepted by the FAA. These aircraft can be used for the following purposes: sport and recreation, flight training, rental and towing.

With regard to certification of pilots and flight instructors to operate light-sport aircraft, the FAA also recently created two new pilot certificates and two new aircraft category ratings to allow operations of light-sport aircraft. The sport pilot certificate and flight instructor certificate with a sport pilot rating are issued without any category and class ratings. Aircraft category, class, and make and model privileges are established through logbook endorsements.

The purpose behind the new FAA certifications is to introduce lightweight recreational aircraft that are geared toward the recreational pilot. It is predicted that this development will result in the spawning of a new industry that services lightweight sport aircraft and recreational pilots. More aircrafts will be seen in the sky and more pilots will be flying. This new development, however, will not come without its drawbacks.

Almost as soon as the new aircraft and pilot certifications emerge, so will safety issues. As a result of the new aircraft certification and the predicted low cost of producing light sport aircraft, there will be more aircraft on the ground and in the air. As a result of the new pilot certification, there will be more and lesser-trained pilots flying these aircraft in the skies. Further, there will be an increased number of novice pilots flying light sport aircraft. The increase in the number of aircraft in the air increases the potential for accidents during flight. The potential for accidents is further compounded by the reduced experience required of the new pilot certification. Additionally, these new aircraft will appear in areas previously not accessible by aircraft like boat marinas, grass fields, etc.

One possible type of design for a light-sport aircraft is an amphibious design. Amphibious aircraft operate on land or water. For land operations, an amphibious aircraft includes conventional wheeled landing gear that must be retracted for water operations. If this landing gear is inadvertently left deployed when the amphibious aircraft lands on the water, the aircraft can be damaged and will likely flip over and submerge. The possibility of this occurrence happening increases with the emergence of larger numbers of beginner or novice pilots controlling amphibious aircraft. Currently, there is no commercially available system for handling the inadvertent deployment of landing gear during water landing and preventing the resulting flipping of the amphibious aircraft.

Therefore, a need exists to overcome the problems with the prior art as discussed above, and particularly for a way to more efficiently control landing gear of an amphibious aircraft.

SUMMARY OF THE INVENTION

Briefly, according to an embodiment of the present invention, a system for controlling landing gear of an aircraft is disclosed. The apparatus includes a sensor for sensing water, wherein the sensor is coupled to the landing gear and a retracting device for retracting the landing gear if the sensor senses a body of water. In one alternative, the aircraft is an amphibious aircraft and the sensor senses electrical conductivity. In another alternative, the retracting device comprises a hydraulic system for deploying and retracting the landing gear, wherein the hydraulic system retracts the landing gear when the sensor senses a body of water. In yet another alternative, the retracting device comprises a locking mechanism that locks the landing gear to the aircraft, wherein the locking mechanism unlocks the landing gear so as to detach it from the aircraft when the sensor senses a body of water.

In another embodiment of the present invention, a system for preventing flipping of an amphibious aircraft during water landing is disclosed. The system includes landing gear extending vertically downwards from an underside of the aircraft. The system further includes a flexible support coupled to the landing gear, wherein the flexible support allows the landing gear to flex vertically when a vertical force is applied to the landing gear. The landing gear flexes vertically when water contacts the landing gear during water landing, so as to prevent the aircraft from flipping. A force necessary to flex the flexible support in a vertical direction is less than a force necessary to flip the aircraft during water landing. In one alternative, the flexible support comprises a leaf spring.

In another embodiment of the present invention, an amphibious aircraft having anti-flip capability is disclosed. The aircraft includes a planar platform surrounding the landing gear in a horizontal position so as to allow the aircraft to hydroplane on the planar platform when contacting water during water landing. The planar platform may be positioned below a midpoint of a wheel of the landing gear.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
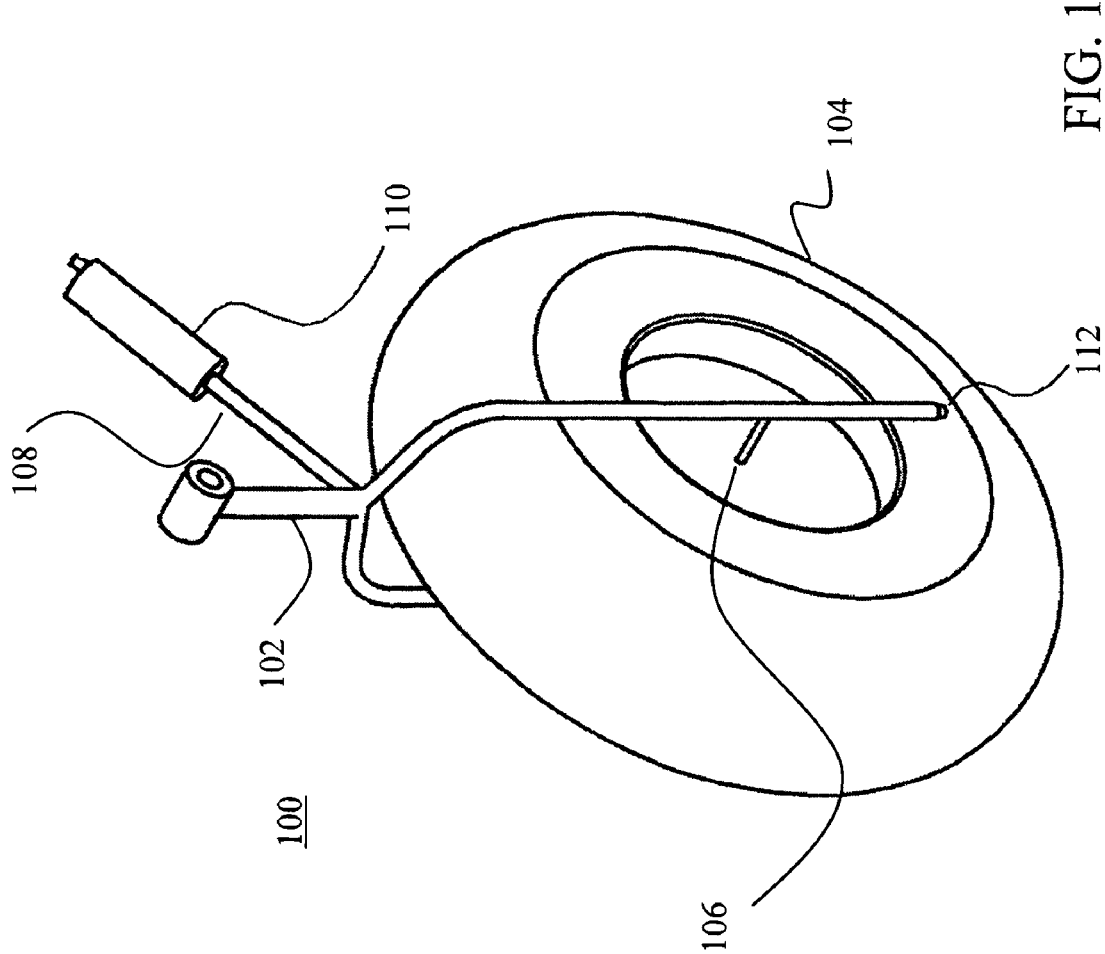
FIG. 1 is an illustration of a landing gear system for preventing flipping of an amphibious aircraft during water landing, in one embodiment of the present invention.

FIG. 1 is an illustration of a landing gear system 100 for preventing flipping of an amphibious aircraft during water landing, in one embodiment of the present invention. The landing gear system 100 of FIG. 1 is situated along the underside of an aircraft, such as an amphibious light-sport aircraft. FIG. 1 shows vertical strut 102, which is a structural member that sustains tension or compression loads along its length axis. Vertical strut 102 attaches to the landing gear wheel 104 at its center point 106 and serves to connect the landing gear to the aircraft. Also shown is diagonal strut 108 which connects to vertical strut 102 and sustains tension or compression loads along its length axis. Diagonal strut 108 is positioned diagonally and connects the vertical strut 102 to the aircraft.

Disposed along the length of diagonal strut 108 is locking mechanism 110, which serves to lock the landing gear in place during use. In one embodiment of the present invention, the locking mechanism 110 may be implemented mechanically, electrically or any combination thereof. For example, the locking mechanism may be a pneumatic cylinder including a pneumatic release valve.

FIG. 1 also shows a water sensor 112 that may be an electrical conductivity sensor that detects the presence of water based on electrical conductivity readings. The information from water sensor 112 may be used to trigger an action that prevents the flipping of the aircraft during water landing. For example, the locking mechanism 110 that holds the landing gear in place may be released. Alternatively, the landing gear 100 may be retracted fully or only enough to prevent flipping. Depending on the design chosen, the landing gear 100 may self-retract under its own power (e.g., electrical or hydraulic), or use the force of the water contact to retract the landing gear 100 or move it to a safer position. Complete retraction may not be necessary to prevent aircraft flipping or damage.

In one embodiment of the present invention, the aircraft to which the landing gear of FIG. 1 is attached is an amphibious light-sport aircraft including a fixed wing, an aircraft engine and a propeller (i.e., propulsion system) including propeller blades that rotate. The fuselage of the aircraft is located under the fixed wing and the cockpit of the aircraft is located under an opening, which is used to allow for ingress and egress of passengers and pilot into and out of the aircraft. The opening is covered with a canopy that opens and closes to allow ingress and egress of passengers.

Figure 2:
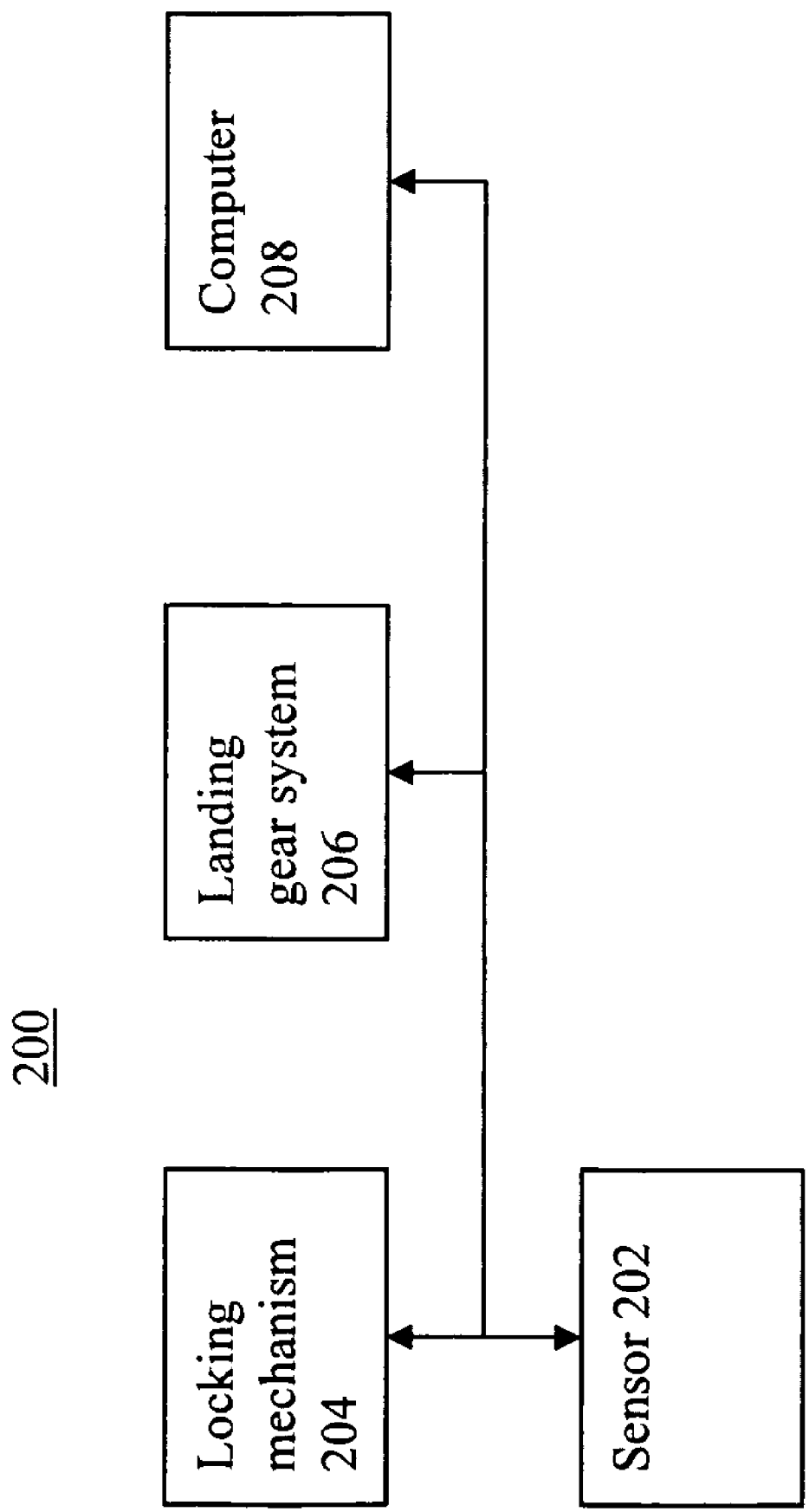
FIG. 2 is a block diagram showing an anti-flipping landing gear control system in accordance with one embodiment of the present invention.

FIG. 2 is a block diagram showing an anti-flipping landing gear control system 200 in accordance with one embodiment of the present invention. FIG. 2 shows the sensor 202 comprising any sensor that may be used to detect the deployment of landing gear during a water landing. Upon sensing the deployment of landing gear during a water landing, sensor 202 relays this information either mechanically or electrically to the locking mechanism 204, the mechanical landing gear deployment/retraction system 206 or the computer 208, or all three components. If the information is relayed electrically, the sensor 202 sends an electrical message such as an electrical impulse via a conductor such as a serial interface connection or a parallel interface connection. If the information is relayed mechanically, the sensor 202 mechanically moves a component such as a moving bar, a dial or a screw.

In one embodiment of the present invention, sensor 202 is a water sensor as described above. In another embodiment, the sensor 202 is a pressure sensor that senses the change between air and water contact. An example of a mechanical pressure sensor is a pressure plate. As the pressure plate is submersed in water at landing speeds, the drag force on the pressure plate can cause the pressure plate to move. The movement of the pressure plate may cause an electrical component to produce an electrical impulse or a mechanical linkage to move. The movement caused by the drag force can also be sensed by a force transducer. An example of an electrical pressure sensor is a pressure transducer that senses the increase in pressure due to water contact. The transducer may subsequently cause an electrical component to produce an electrical impulse or a mechanical linkage to move. In another embodiment of the present invention, the sensor 202 is a combination of an electrical conductivity sensor, as described above, and a pressure sensor, also described above.

In one embodiment of the present invention, sensor 202 is an accelerometer. Accelerometers can also be used to sense water contact. In this case, the accelerometer measures resulting rotational moments on the aircraft as the landing gear contacts the water. When the gear contacts the water at landing speeds it will cause the aircraft to rotate dramatically as the process of flipping over begins. This rotation can be sensed immediately by accelerometers located strategically on the aircraft structure. When acceleration levels are sensed and analyzed to correspond to a gear-down water landing, an electrical component of the sensor 202 produces an electrical impulse or a mechanical linkage moves.

FIG. 2 also shows a locking mechanism 204, which serves to lock the landing gear in place during use. The locking mechanism 204 may be any number of common locks found on conventional landing gear. In one embodiment of the present invention, the locking mechanism 110 may be implemented mechanically, electrically or any combination thereof. Examples include a mechanical lock, an electrical solenoid, a pneumatic valve, or any combination thereof. For example, the locking mechanism 204 may be a pneumatic cylinder including a pneumatic release valve. When unlocked, the locking mechanism 204 may allow the landing gear to be retracted or moved into a safer position. Alternatively, when unlocked, the locking mechanism 204 may allow the landing gear to be completely detached form the aircraft and fall away.

In another embodiment of the present invention, the locking mechanism 110 may be designed to yield at a designed load value. This load value is less than the drag needed to flip the aircraft. Therefore, if landing in water with the landing gear deployed, the drag will yield the locking mechanism 110 before causing the aircraft to flip. An alternative method comprises structural members of the landing gear which physically fail and separate from the aircraft when a specified load is exceeded upon contact with water. For example a pin attaching the landing gear strut 102 can fail at a designed lateral load.

FIG. 2 also shows a mechanical landing gear deployment/retraction system 206. This conventional system 206 is used to deploy and retract landing gear during regular use of the aircraft. The system 206 may be connected to and communicate with the sensor 202, the lock 204 or the computer 208, or all of the above. For example, the system 206 may be coupled with the sensor 202 and may retract the landing gear when it receives a signal or instruction from the sensor 202 indicating that the landing gear should be retracted. In another example, the system 206 may be coupled with the computer 208 and may retract the landing gear when it receives a similar signal or instruction from the computer 208 indicating that the landing gear should be retracted.

FIG. 2 also shows a computer 208 which may be connected to and communicate with the sensor 202, the locking mechanism 204 or the landing gear deployment/retraction system 206, or all of the above. See FIG. 6 for a more detailed description of the computer 208. The computer 208 may be used to determine when the landing gear should be retracted or detached if found to be deployed during water landing. For example, the computer 208 may be coupled with the sensor 202 and may receive a signal or instruction from the sensor 202 indicating that the landing gear is deployed during water landing. Based on sensor data it receives, the computer 208 may send a signal or instruction to the landing gear deployment/retraction system 206 instructing it to retract the landing gear. Alternatively, the computer 208 may send a signal or instruction to the locking mechanism 204 instructing it to detach the landing gear. In another alternative, the computer 208 may send a signal or instruction to the landing gear deployment/retraction system 206 instructing it to move the landing gear to a safer position, instead of fully retracting it.

In another embodiment of the present invention, the computer 208 may also receive other sensor data that it uses to determine whether to retract the landing gear. For example, the computer 208 may additionally consider wind speed data, altitude data or air pressure data during the determination process.

Figure 3:
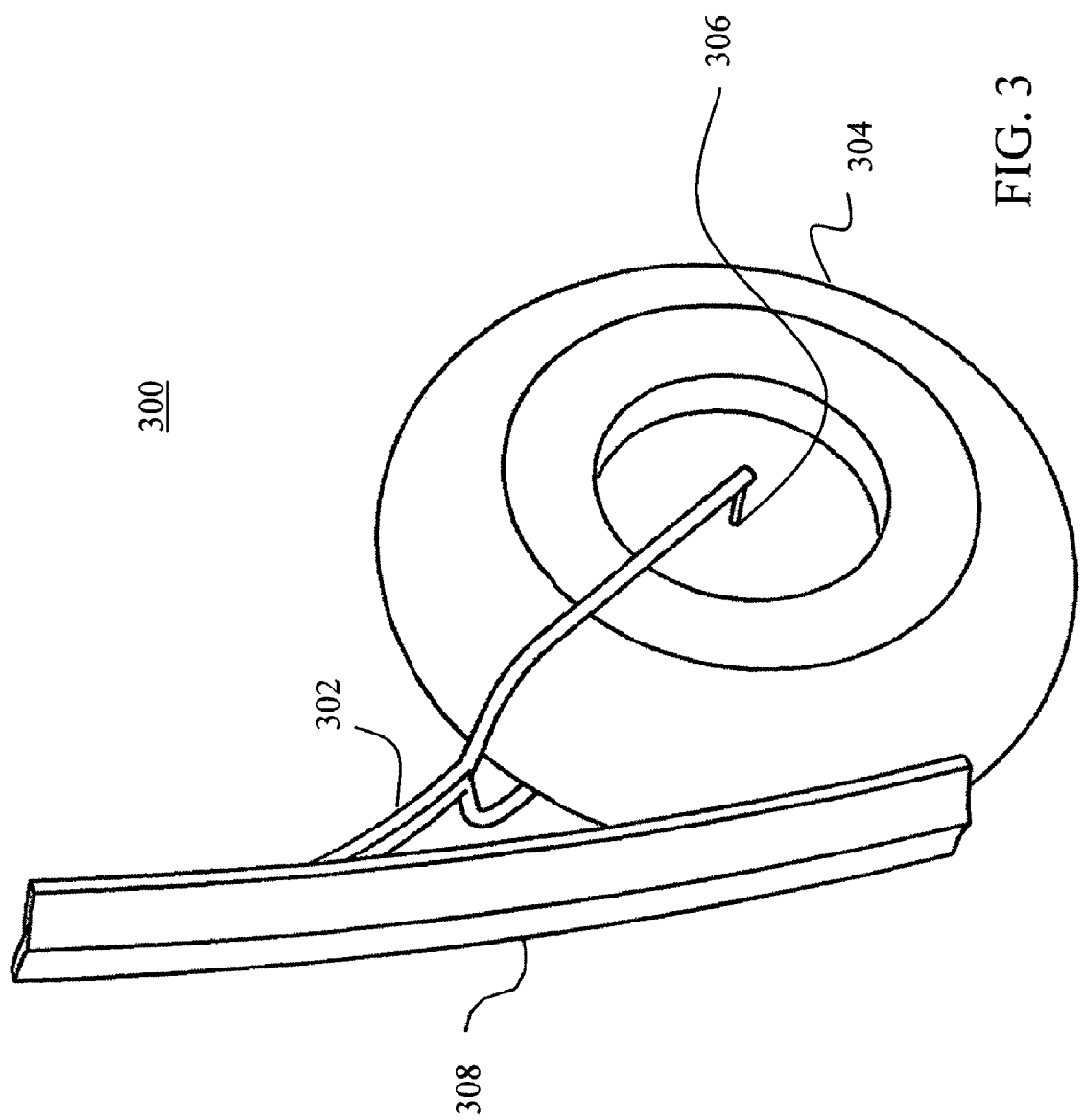
FIG. 3 is an illustration of another landing gear system for preventing flipping of an amphibious aircraft during water landing, in one embodiment of the present invention.

FIG. 3 is an illustration of another landing gear system 300 for preventing flipping of an amphibious aircraft during water landing, in one embodiment of the present invention. The landing gear system 300 of FIG. 3 is situated along the underside of an aircraft, such as an amphibious light-sport aircraft. FIG. 3 shows a nearly vertical strut 302, which is a structural member that sustains tension or compression loads along its length axis. Vertical strut 302 attaches to the landing gear wheel 304 at its center point 306 and serves to connect the landing gear to the aircraft. Vertical strut 302 may be flexible in the vertical direction so as to allow vertical flexing when a horizontal force is applied, such as when water is contacted by the landing gear during a water landing. FIG. 3 also shows a leading ski 308 that precedes the strut 302 and the wheel 304.

If the landing gear is deployed during water landing, the pressure of the water contacting the system 300 forces the vertical strut 302 to flex or bend into a safer position. In conventional landing gear, when a vertical component force from a normal ground landing is applied, the landing gear flexes a small amount required for shock absorption during land landings. In the present invention, the increased horizontal component force created by the system 300 contacting the water at aircraft landing speeds will flex the vertical strut 302 an amount sufficient to move the landing gear into a safer position or retract it fully. In one embodiment of the present invention, the drag force necessary on the system 300 to flip the aircraft is greater than a stiffness of the vertical strut 302. As the drag force approaches a value where the aircraft may flip, the vertical strut 302 flexes, thereby moving the landing gear to a safer position and reducing drag. This ensures the drag induced by the landing gear does not cause the aircraft to flip. In one embodiment of the present invention, the vertical strut 302 comprises a leaf spring.

The leading ski 308 is depicted in front of the system 300. When the system 300 is submersed in water up to a certain depth, the leading ski 308 contacts the water and causes the vertical strut 302 to flex as well as hydroplane until the aircraft slows to a safe speed. Flexion of the vertical strut 302 as well as hydroplaning on the ski 308 reduces the drag forces low enough to prevent flipping.

Figure 4:
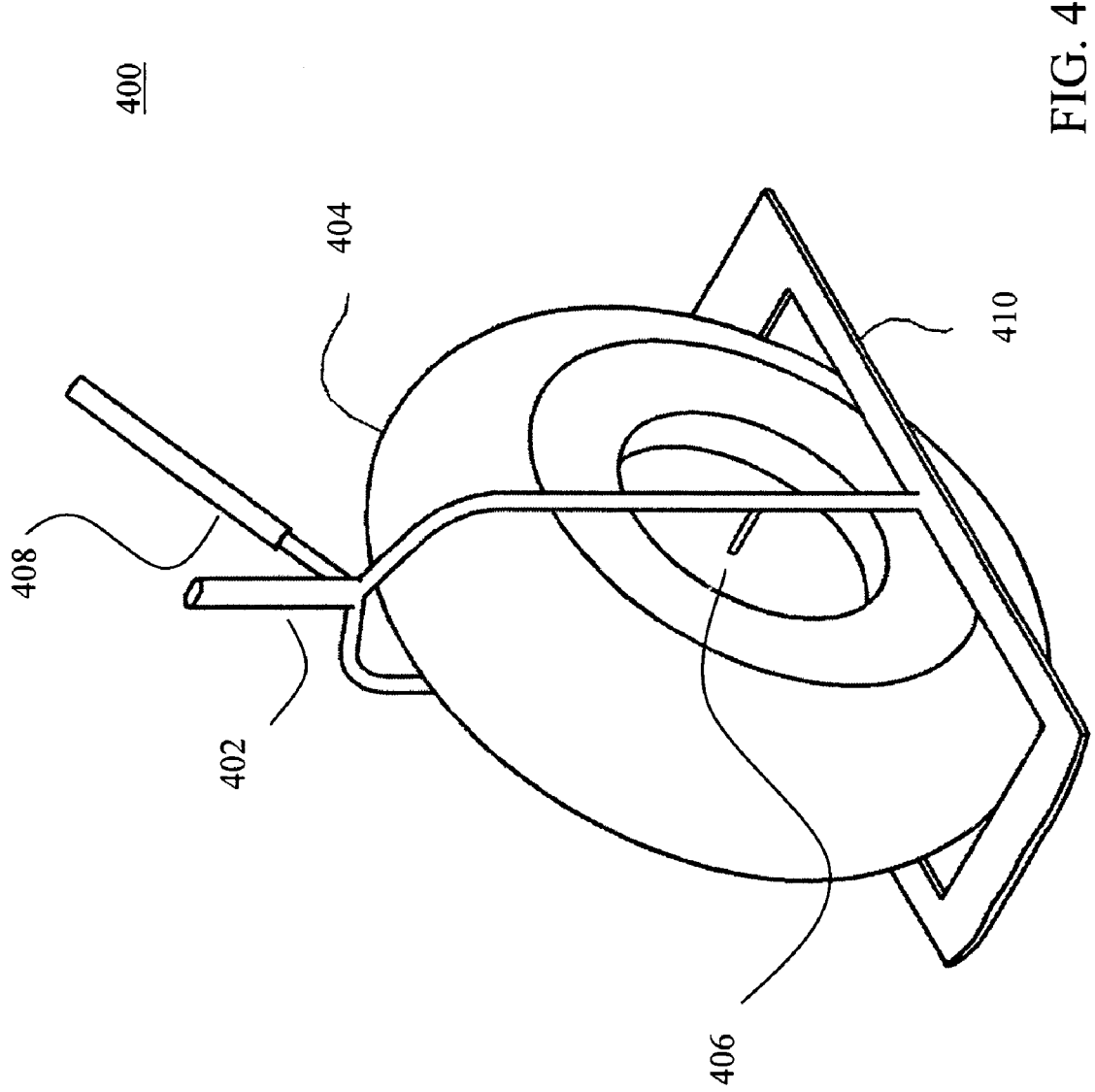
FIG. 4 is an illustration of yet another landing gear system for preventing flipping of an amphibious aircraft during water landing, in one embodiment of the present invention.

FIG. 4 is an illustration of another landing gear system 400 for preventing flipping of an amphibious aircraft during water landing, in one embodiment of the present invention. The landing gear system 400 of FIG. 4 is situated along the underside of an aircraft, such as an amphibious light-sport aircraft. FIG. 4 shows vertical strut 402, which is a structural member that sustains tension or compression loads along its length axis. Vertical strut 402 attaches to the landing gear wheel 404 at its center point 406 and serves to connect the landing gear to the aircraft. Also shown is diagonal strut 408 which connects to vertical strut 402 and sustains tension or compression loads along its length axis. Diagonal strut 408 is positioned diagonally and connects the vertical strut 402 to the aircraft.

Also shown is ski platform 410 which surrounds the wheel 404 as depicted in FIG. 4. In one embodiment, the ski platform 410 is a planar element is a horizontal position and situated lower than the center point 406. During water landing, when the system 400 is submersed in water up to a specific depth, the ski platform 410 contacts the water. The aircraft hydroplanes on this ski platform 410 until, similar to the previous embodiment, the aircraft slows to a safe speed. During this phase, the aircraft will actually "ski" on top of the water surface until the aircraft slows and settles into the water.

Figure 5:
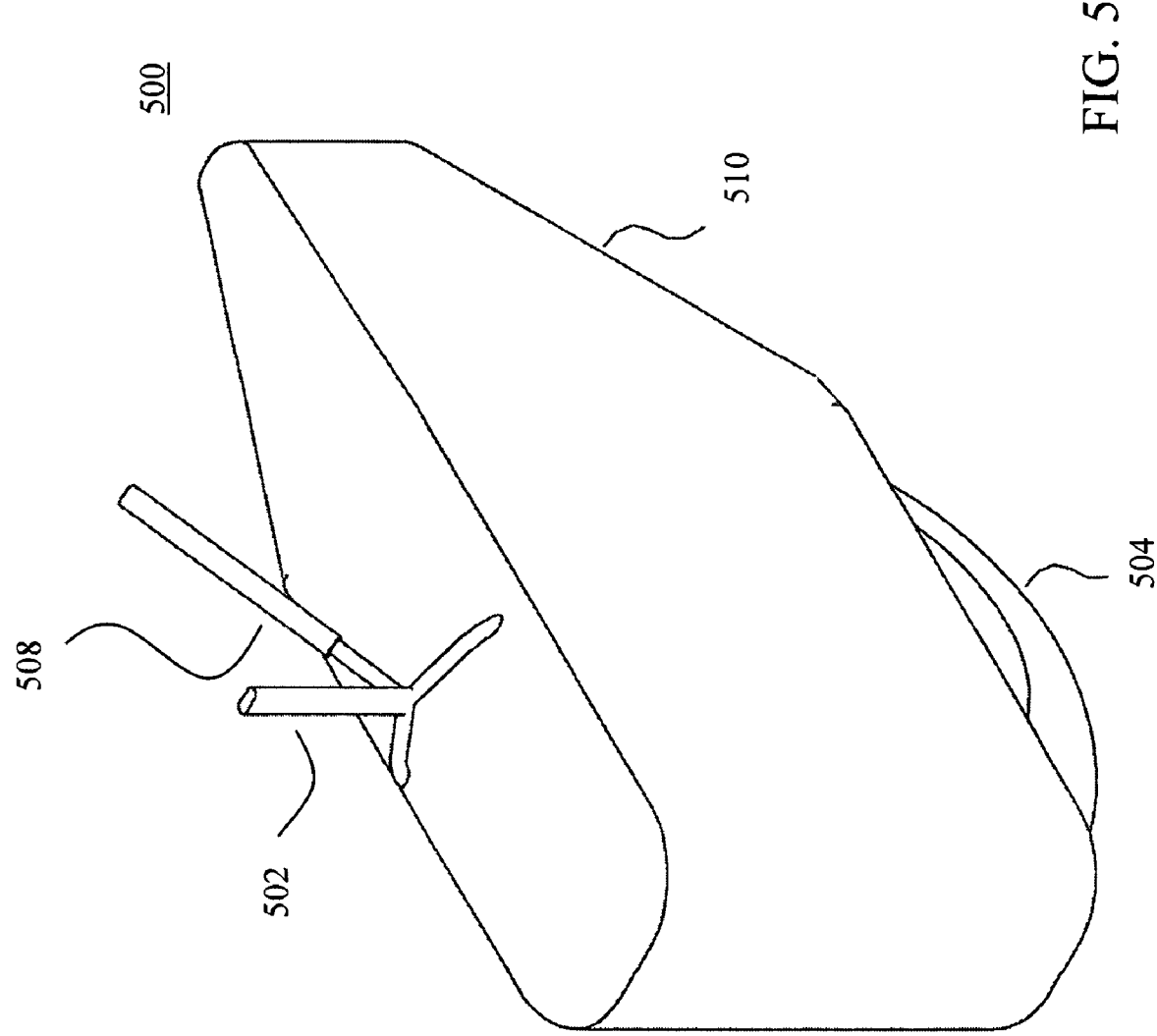
FIG. 5 is an illustration of yet another landing gear system for preventing flipping of an amphibious aircraft during water landing, in one embodiment of the present invention.

FIG. 5 is an illustration of another landing gear system 500 for preventing flipping of an amphibious aircraft during water landing, in one embodiment of the present invention. The landing gear system 500 of FIG. 5 is situated along the underside of an aircraft, such as an amphibious light-sport aircraft. FIG. 5 shows vertical strut 502, which is a structural member that sustains tension or compression loads along its length axis. Vertical strut 502 attaches to the landing gear wheel 504 at its center point (not shown) and serves to connect the landing gear to the aircraft. Also shown is diagonal strut 508 which connects to vertical strut 502 and sustains tension or compression loads along its length axis. Diagonal strut 508 is positioned diagonally and connects the vertical strut 502 to the aircraft.

FIG. 5 also shows a wheel cover 510 that encloses an upper portion of the wheel 504. This wheel cover 510 is streamlined to reduce drag on the system 500 when immersed in water during a water landing. The streamlining of the wheel cover 510 reduces drag by introducing a hydro-dynamically efficient shape into the water during a water landing. This embodiment of the present invention allows the aircraft to safely land in water with the landing gear deployed without being damaged or flipping.

Figure 6:
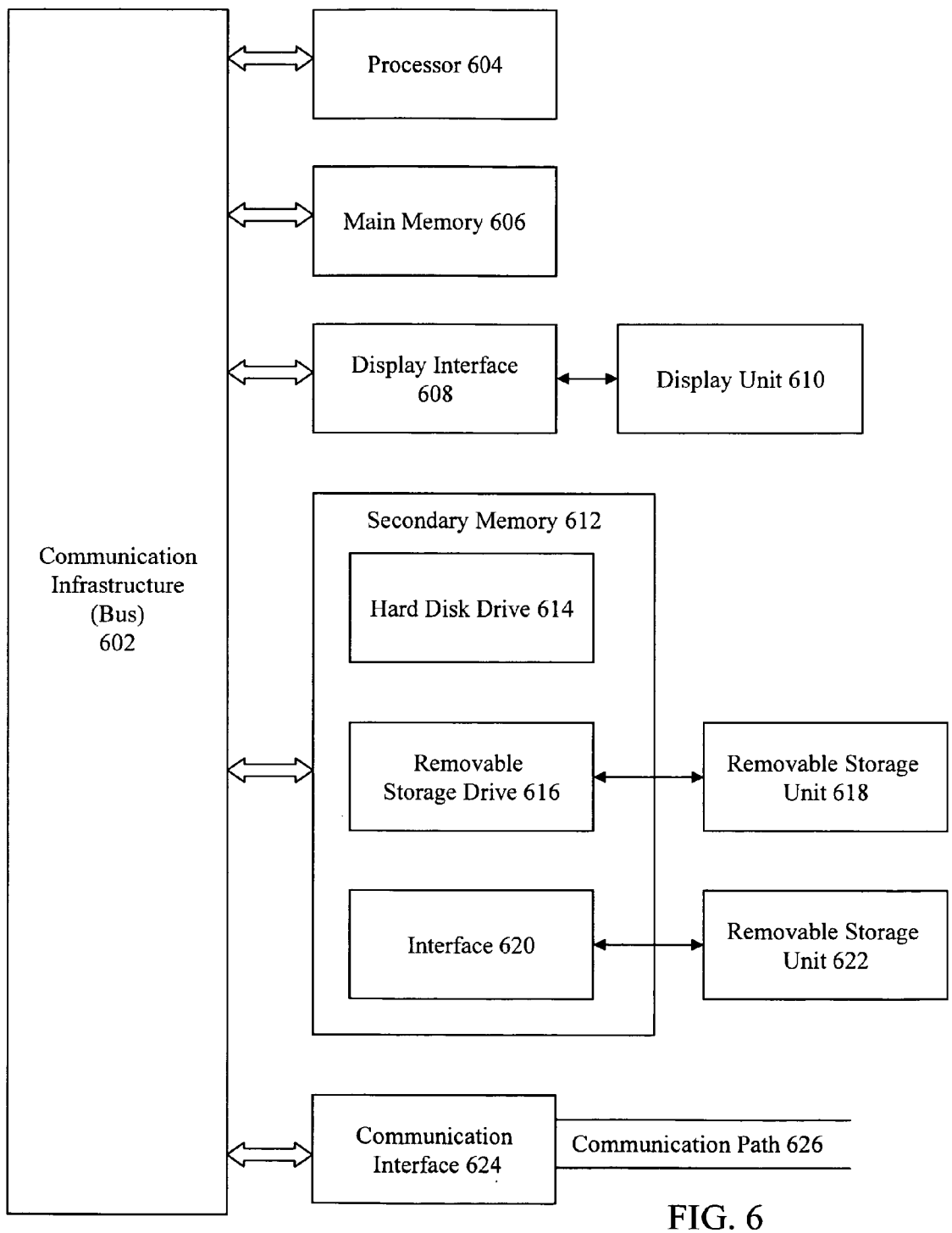
FIG. 6 is a block diagram showing a computer system useful for implementing the present invention.

FIG. 6 is a high level block diagram showing an information processing system useful for implementing one embodiment of the present invention. FIG. 6 represents one embodiment of the computer 208 of FIG. 2. The computer 208 can be realized in hardware, software, or a combination of hardware and software. A computer 208 according to a preferred embodiment of the present invention can be realized in a centralized fashion including one processor or in a distributed fashion where different elements are spread across several processors. Any kind of information processing system—or other apparatus adapted for carrying out the methods described herein—is suited. A typical combination of hardware and software could be a general-purpose computer system with a computer program that, when being loaded and executed, controls the computer system such that it carries out the methods described herein.

The computer system of FIG. 6 includes one or more processors, such as processor 604. The processor 604 is connected to a communication infrastructure 602 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 608 that forwards graphics, text, and other data from the communication infrastructure 602 (or from a frame buffer not shown) for display on the display unit 610. The computer system also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents a floppy disk, a compact disc, magnetic tape, optical disk, etc. which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCM-CIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allow a computer to read such computer readable information.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A system for controlling landing gear of an aircraft, comprising:

landing gear including a retracting device for retracting the landing gear;

an electrical conductivity water sensor coupled to the landing gear, wherein the sensor transmits a signal when water is sensed; and a microprocessor configured for automatically initiating retraction of the landing gear when the signal is received from the water sensor.

2. The system of claim 1, wherein the aircraft is an amphibious aircraft.

3. The system of claim 2, wherein the signal is an electrical signal transmitted through a conductor.

4. The system of claim 2, wherein the retracting device receives a signal from the microprocessor initiating retraction of the landing gear.

5. The system of claim 4, wherein the retracting device is a mechanical device.

6. The system of claim 4, wherein the retracting device can further detach the landing gear.

7. The system of claim 4,
wherein the retracting device is a hydraulic system for deploying and retracting the landing gear.

8. The system of claim 4,
wherein the retracting device is an electrical system for deploying and retracting the landing gear.

9. The system of claim 4, further comprising:
a locking mechanism that locks the landing gear to the aircraft, wherein the locking mechanism unlocks the landing gear so as to detach it from the aircraft when initiated by the microprocessor.

10. The system of claim 2
wherein the microprocessor is further configured for considering additional sensor data before sending a signal to the landing gear so as to initiate retraction when the signal is received from the water sensor.

11. The system of claim 10,
wherein the retracting device is a hydraulic system for deploying and retracting the landing gear.

12. The system of claim 10,
wherein the retracting device is an electrical system for deploying and retracting the landing gear.

13. The system of claim 10, further comprising:
a locking mechanism that locks the landing gear to the aircraft, wherein the locking mechanism receives a signal from the processor to unlock the landing gear so as to detach it from the aircraft.

14. The system of claim 13, wherein the locking mechanism comprises a pneumatic cylinder and a pneumatic relief valve that releases pressure within the pneumatic cylinder when the locking mechanism receives a signal from the processor to unlock the landing gear so as to detach it from the aircraft.

15. The system of claim 13, wherein the locking mechanism comprises a mechanical lock that unlocks when the locking mechanism receives a signal from the processor to unlock the landing gear so as to detach it from the aircraft.

16. A system for controlling landing gear of an aircraft, comprising:
landing gear including a retracting device for retracting the landing gear;
at least one accelerometer for sensing forward rotation of the aircraft, wherein the at least one accelerometer transmits a signal when forward rotation of the aircraft is sensed;
a microprocessor configured for automatically initiating retraction of the landing gear when the signal is received from the at least one accelerometer.

* * * * *